United States Patent [19]

Gormley

[11] Patent Number: 4,867,652
[45] Date of Patent: Sep. 19, 1989

[54] BALANCED ROLLING ROTOR MOTOR COMPRESSOR

[75] Inventor: Thomas P. Gormley, Liverpool, N.Y.

[73] Assignee: Carrier Corporation, Syracuse, N.Y.

[21] Appl. No.: 281,379

[22] Filed: Dec. 8, 1988

[51] Int. Cl.[4] ............................................. F04B 35/04
[52] U.S. Cl. ...................................... 417/353; 418/6; 418/59; 310/82; 310/114; 310/116
[58] Field of Search ....................... 417/353; 418/6, 59, 418/11; 310/67 R, 114, 116, 82

[56] References Cited

U.S. PATENT DOCUMENTS

| | | | |
|---|---|---|---|
| 2,535,019 | 12/1950 | Steensen | 417/353 |
| 2,561,890 | 7/1951 | Stoddard | 417/353 |
| 2,579,865 | 12/1951 | Roters | 310/67 R |

FOREIGN PATENT DOCUMENTS 1379498  3/1988  U.S.S.R. ............................... 417/353

Primary Examiner—Carlton R. Croyle
Assistant Examiner—D. Scheuermann
Attorney, Agent, or Firm—David J. Zobkiw

[57] ABSTRACT

A rolling rotor motor/compressor is made with a stator and both an inner and an outer rotor which serve to mechanically balance the device. The device can be configured to be a single compressor, two compressors, staged compressors as well as functioning as a motor. In the preferred embodiment the rotors are restricted to an orbiting movement.

7 Claims, 5 Drawing Sheets

ON AT OFF

ON BEFORE OFF 4,867,652

BALANCED ROLLING ROTOR MOTOR COMPRESSOR

BACKGROUND OF THE INVENTION

A rolling rotor motor is one in which only a portion of the windings are activated at any given time and the resultant asymmetric magnetic field is moved around the stator by changing which ones of the windings are the activated windings. This type of motor is characterized by high torque and low speed. Where the rotor is located internally of the stator, the coaction between the rotor and stator as a result of the asymmetric magnetic field, unless otherwise limited, is like that of the piston and cylinder of a rolling piston or reciprocating vane type compressor. As a result, the rotor may also be the piston of a rolling piston compressor such as is disclosed in U.S. Pat. No. 2,561,890. Since the rotor rolls around the stator, there are low bearing loads as compared to a motor in which the rotor is constrained to rotate about a fixed axis.

The rolling rotor motor can be integral with the compressor thereby reducing the size and number of parts such as shafts and bearings, but it has some inherent disadvantages. Because only some of the windings are activated at any particular time, the output torque per pound of motor weight is less than it would be for an induction motor. Also, the rotor is dynamically unbalanced since its center traces a circular orbit as it moves circumferentially towards the activated windings due to magnetic attraction as it follows the rotating field. The unbalance forces increase with the square of the rotor speed thus making the motor unsuitable for high speed applications.

SUMMARY OF THE INVENTION

An annular stator has a cylindrical rotor located within it and is surrounded by an annular rotor. The stator and rotors are within a housing which provides fluid pressure sealing where the device is both a motor and a compressor. The axes of the stator and two rotors are such that the movement of the two rotors to the portion of the stator having the activated coil(s) results in the axis of the two rotors and the stator being aligned but with the axis of the stator between the axes of the rotors whereby the mechanical forces are balanced. However, the rotor is free to change its radius of operation such as rolling over foreign material on the inside of the stator or a liquid slug when used as a compressor.

It is an object of this invention to dynamically balance a rolling rotor motor/compressor.

It is another object of this invention to provide a dual compression, mechanically balanced compressor.

It is an additional object of this invention to utilize the work done by the balance weight in the compression cycle of a rolling rotor motor compressor.

It is further object of this invention to permit the rolling rotor to change its radius of operation. These objects, and others as will become apparent hereinafter, are accomplished by the present invention.

Basically, a first rotor is located with a stator and a second rotor surrounds the stator. When the motor is operated as a rolling rotor motor, both rotors move towards the portion of the stator having the activated windings with the result that their centers of gravity are located relative to the center of gravity of the stator such that they are in balance. When the motor is also a rolling rotor motor compressor or each rotor acts as the piston of a rolling piston compressor. Although the rotors could actually rotate, they are limited to orbiting motion in the preferred embodiment.

BRIEF DESCRIPTION OF THE DRAWINGS

For a fuller understanding of the present invention, reference should now be made to the following detailed description thereof taken in conjunction with the accompanying drawings wherein.

DESCRIPTION OF THE PREFERRED EMBODIMENTS

Figure 1:
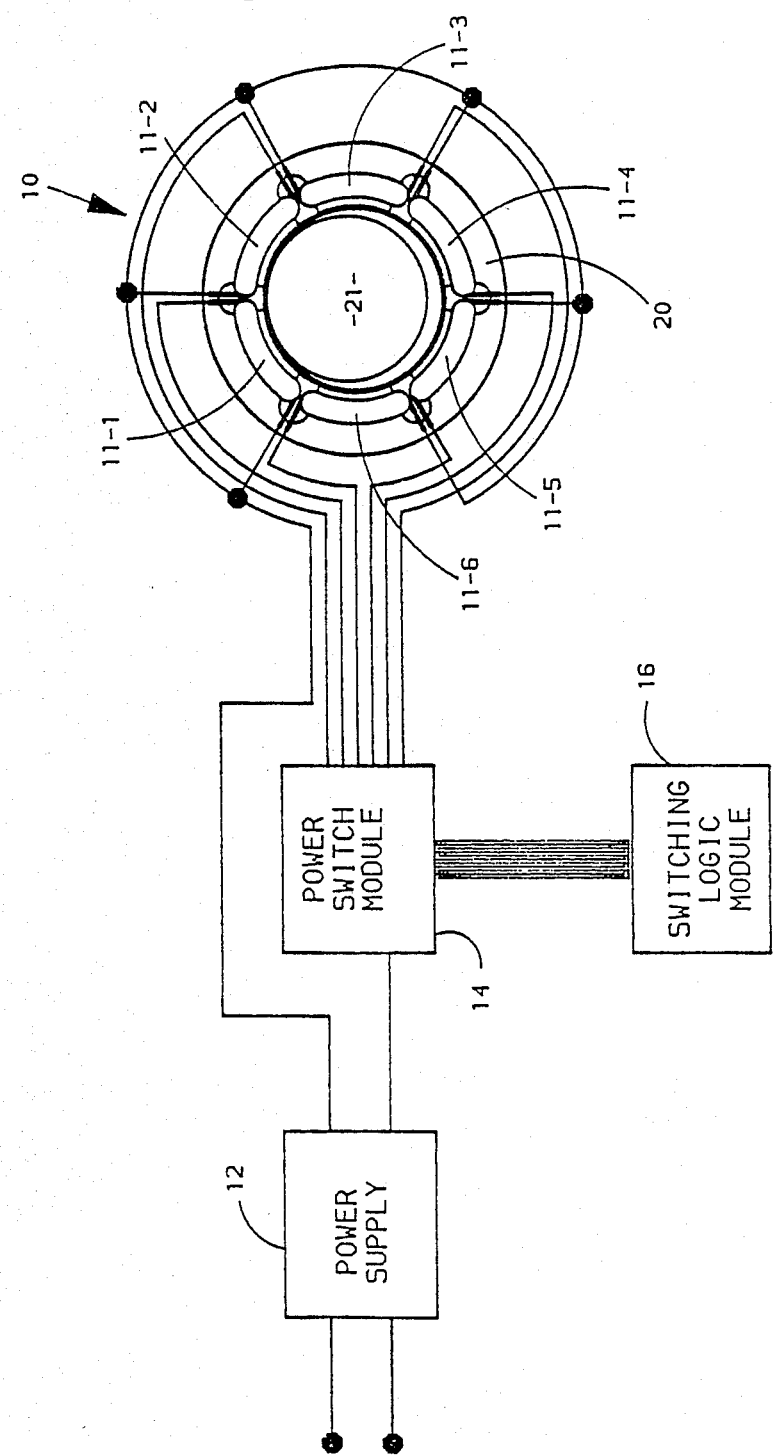
FIG. 1 is a circuit diagram for a rolling rotor motor/compressor.
Figure 2:
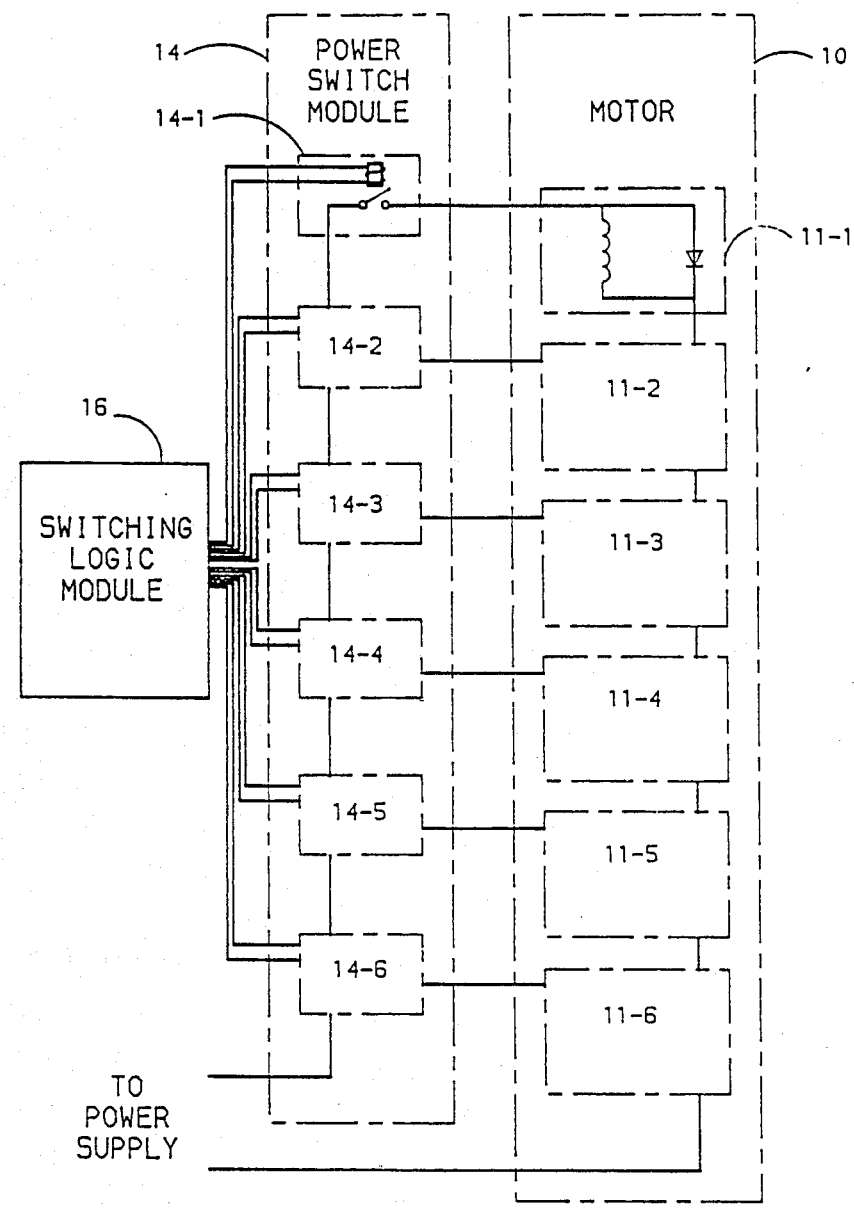
FIG. 2 is a more detailed view of the switching portion of the circuit of FIG. 1.
Figure 3:
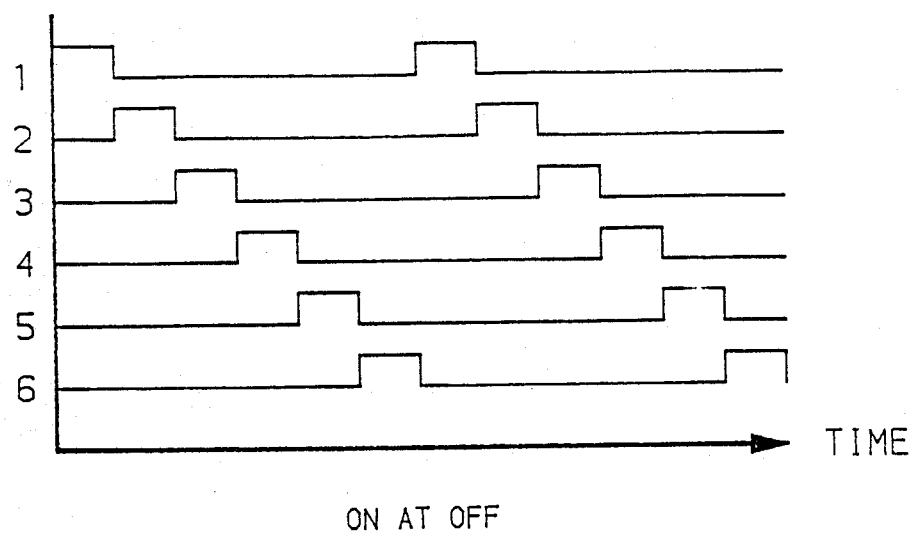
FIG. 3 is a graph showing the actuation of the switches as a function of time in the on at off mode; 1
Figure 4:
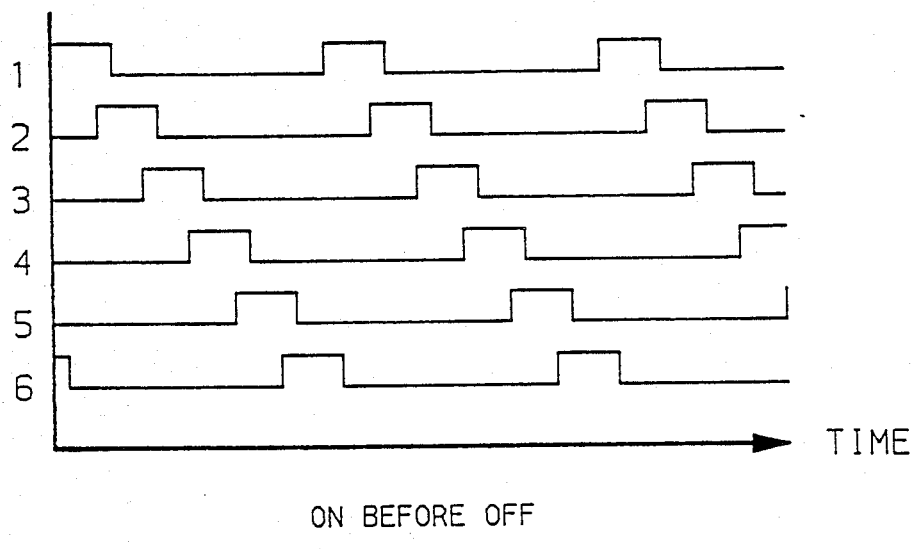
FIG. 4 is a graph showing the actuation of the switches as a function of time in the on before off mode.

In FIG. 1 the numeral 10 generally designates a rolling rotor motor/compressor which has a plurality of windings with six, 11-1 to 6, being illustrated. Power from power supply 12 is supplied to windings 11-1 to 6 by power switch module 14 under the control of switching logic module 16. Referring to FIG. 2, it will be noted that the power supply 12 is connected to windings 11-1 to 6 through switches 14-1 to 6 which are controlled by switching logic module 16. Switch 14-1 is illustrated as solenoid actuated but any suitable power switching may be employed. Switches 14-1 to 6, as illustrated in FIG. 3, can be actuated in an "on at off" mode wherein the shutting off of power to one winding coincides with the supplying of power to the next winding. Alternatively, as illustrated in FIG. 4, switches 14-1 to 6 can be actuated in an "on before off" mode wherein power is supplied to a winding for a short period of time after power is supplied to the next winding.

Figure 6:
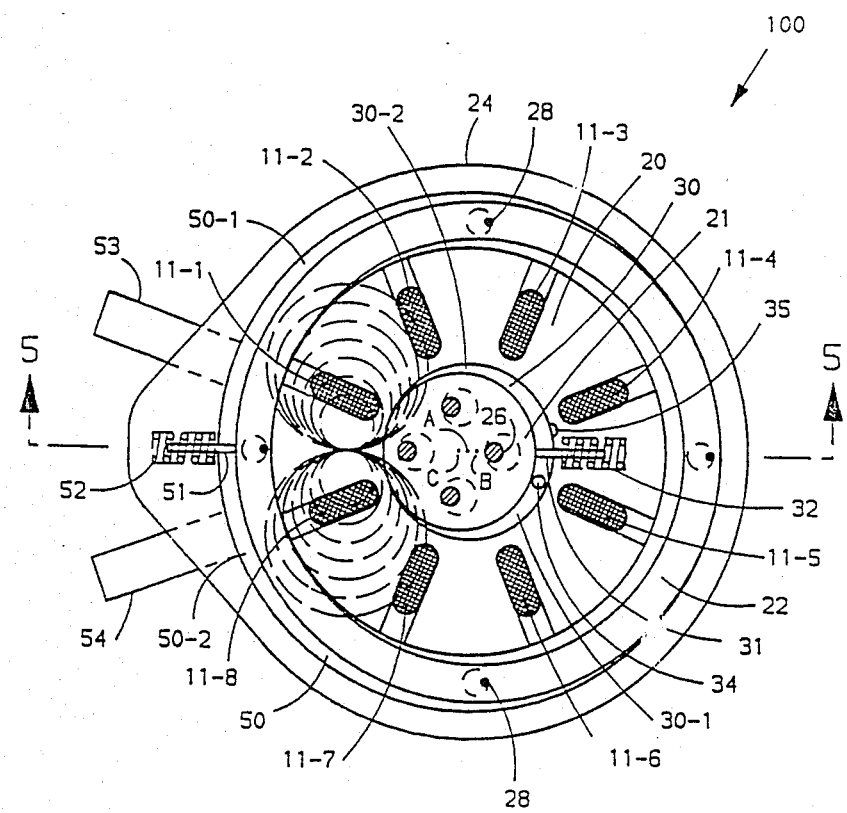
FIG. 6 is a horizontal section taken along line 6—6 of FIG. 5.
Figure 5:
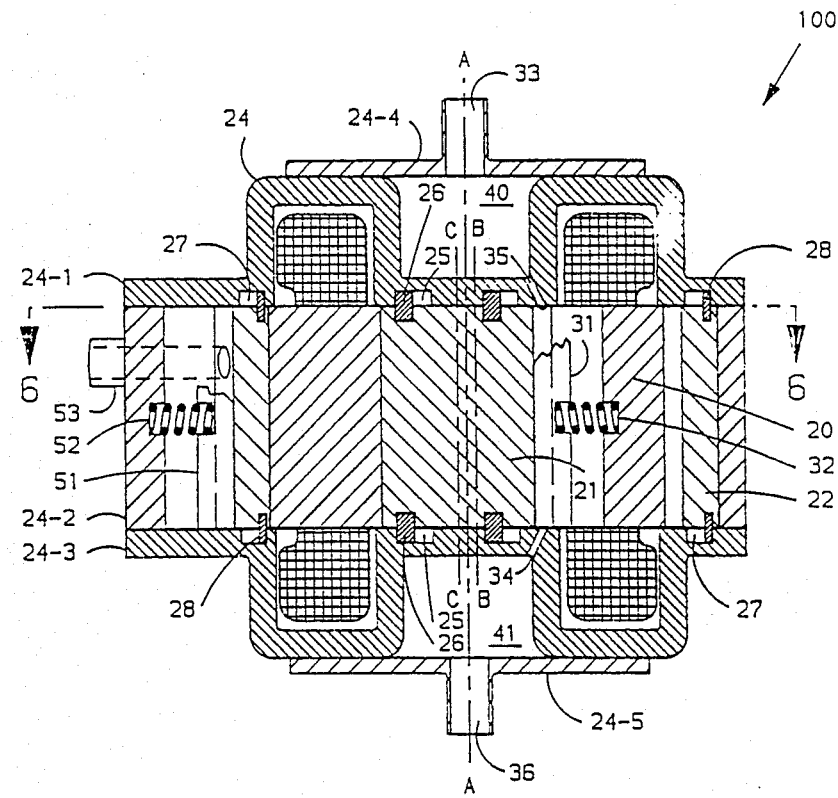
FIG. 5 is a vertical and partially cutaway section of a rolling rotor motor/compressor taken along line 5—5 of FIG. 6.

In FIGS. 5 and 6 the numeral 100 generally designates a rolling rotor motor/compressor which includes a stator 20 with windings 11-1 to 8 and a rotor/piston 21 like rolling motor/compressor 10 of FIG. 1. Additionally, rotor/piston 22 surrounds stator 20. End frames 24-1 and 3 and middle portion 24-2 define the top, bottom and middle, respectively, of hermetic shell 24. End frame portions 24-1 and 3 of shell 24 are dished and together with end pieces 24-4 and 5 define suction and discharge chambers 40 and 41, respectively. End frames 24-1 and 3 have a plurality of circular recesses 25 formed therein. Recesses 25 receive pins 26 which are integral with rotor 21. Similarly, end frames 24-1 and 3 also have a plurality of circular recesses 27 formed therein. Recesses 27 receive pins 28 which are integral with rotor 22. As shown in phantom in FIG. 6, pins 26 and 28 coact with recesses 25 and 27 respectively to limit rotors 21 and 22 to an orbiting motion. The coaction of pins 26 and 28 with recesses 25 and 27 in addition to restricting the rotors 21 and 22 to orbiting movement also permit radial movement of rotors 21 and 22 to permit unloading as where a liquid slug is encountered.

During operation, as the magnetic field moves about the stator 20 through the selective sequential activation of some of the windings 11-1 to 8, as described above, rotor/pistons 21 and 22 tend to follow the magnetic field and coact with the stator 20 in the manner of the coaction of the piston and cylinder of a rolling piston compressor with rotor/pistons 21 and 22 touching stator 20 at the location of the activated winding(s). As a result, A—A, the geometric axis of stator 20 is located in a plane with and intermediate B—B, the geometric axis of rotor 22, and, C—C, the geometric axis of rotor 21 thereby mechanically balancing rolling rotor motor/compressor 100. Inner rotor 21 and stator 20 coact to define chamber 30 and as inner rotor 21 orbits, it maintains contact with stator 20. Vane 31 is reciprocatably biased into contact with inner rotor 21 by spring 32 and divides chamber 30 into suction chamber 30-1 and discharge chamber 30-2. Suction chamber 30-1 is serially supplied via suction inlet 33, suction chamber 40 and suction passage 35. Discharge from chamber 30-2 serially passes through discharge passage 34, discharge chamber 41 and discharge outlet 36.

Outer rotor 22 and shell 24 coact to define chamber 50 and as outer rotor 22 orbits it maintains contact with both stator 20 and shell 24. Vane 51 is reciprocatably biased into contact with outer rotor 22 by spring 52 and divides chamber 50 into suction chamber 50-1 and discharge chamber 50-2. Suction chamber 50-1 is supplied via inlet 53 and discharge chamber discharges via outlet 54.

With the magnetic field moving in a clockwise direction, as illustrated, rotors 21 and 22 each move in an orbiting motion due to the coaction of pins 26 with recesses 25 and pins 28 with recesses 27. If rolling rotor motor 100 is operating solely as a motor, this orbiting motion is suitable for driving the orbiting scroll of a scroll compressor. Rotor 22 will serve the function of a counterweight in mechanically balancing out the forces produced by rotor 21. If a rotary motion is desired, pins 26 and 28, as well as recesses 25 and 27, can be eliminated and a rotary output will be produced. As in the case of orbiting motion, rotor 22 serves to mechanically balance the forces of rotor 21.

When rolling rotor motor/compressor 100 is operated as a compressor, it may be operated as a single compressor, two compressors or staged compressors. Because rotors 21 is much smaller than rotor 22, chamber 50 is ordinarily designed to be much larger than chamber 30. As a result, the compressor defined by rotor 21 and stator 20 would ordinarily be of a considerably smaller displacement than the compressor defined by rotor 22 and stator 20. This permits the choosing of two different compressor capacities. Also, it permits the sizing to be such that the compressor defined by rotor 21 and stator 20 can be a second stage to the compressor defined by rotor 22 and stator 20.

The operation of each of the compressors is conventional in coaction for that of a rolling piston compressor except that, in the preferred embodiment, rotors 21 and 22 orbit rather than rotate. If desired, however, pins 26 and 28 as well as recesses 25 and 27 can be eliminated to cause the conventional rolling orbiting motion. For the compressor defined by rotor 22 and the shell 24, during operation as a compressor, gas is drawn into the suction chamber portion 50-1 of chamber 50 via inlet 53, is compressed and discharged from the discharge chamber portion 50-2 of chamber 50 via outlet 54. For the compressor defined by rotor 21 and stator 20, during operation as a compressor, gas is drawn into the suction chamber portion 30-1 of chamber 30 serially through suction inlet 33, suction chamber 40 and suction passage 35, is compressed and discharged from the discharge chamber portion 30-2 of chamber 30 serially through discharge passage 34, discharge chamber 41 and discharge outlet 36. If there is staged compression, outlet 54 would be connected to suction inlet 33.

Although a preferred embodiments have been illustrated and described, other changes will occur to those skilled in the art. For example, outlet 54 and inlet 33 may be connected through internal passages and chambers 40 and 41 may be eliminated by connecting inlet 33 and outlet 36 directly to passages 35 and 34, respectively. Also, the stator may be provided with a liner if necessary, or desirable. It is therefore intended that the scope of the present invention is to be limited only by the scope of the appended claims.

What is claimed is:

1. A rolling rotor motor means comprising:
   housing means;
   stator means within said housing means and having a geometric axis, a plurality of windings and cylindrical opening therein;
   cylindrical rotor means having a geometric axis and located within said cylindrical opening and defining therewith a first chamber;
   annual rotor means having a geometric axis and located in said housing means and surrounding said stator;
   said annular rotor means and said housing means together defining a second chamber;
   whereby upon actuation of a portion of said plurality of windings, said cylindrical and annular rotor means are drawn into contact with said stator means at the location of said actuated portion of said plurality of windings such that said geometric axes of said stator means and said cylindrical and annular rotor means define a plane with said axis of said stator being between the axes of said cylindrical and annular rotor means so that said rolling rotor motor means is mechanically balanced.

2. The rolling rotor motor means of claim 1 further including means for limiting said cylindrical and annular rotor means to move orbital and radial motion.

3. The rolling rotor motor means of claim 1 further including vane means extending into said first chamber and a fluid inlet port and a fluid outlet port on either side of said vane whereby said cylindrical rotor means and said stator means coact to define a rolling rotor compressor.

4. The rolling rotor motor means of claim 3 further including vane means extending into said second chamber whereby said annular rotor means and said housing means coact to define a rolling rotor compressor.

5. The rolling rotor motor means of claim 4 wherein said rolling rotor compressor defined by said annular rotor means and said housing means defines a first stage compressor and said rolling rotor compressor defined by said cylindrical rotor means and said stator means defines a second stage compressor.

6. The rolling rotor motor means of claim 4 further including means for limiting said cylindrical and annular rotor means to orbital and radial motion.

7. The rolling rotor motor means of claim 1 further including vane means extending into said second chamber whereby said cylindrical rotor means and said stator means coact to define a rolling rotor compressor.

* * * * *